(12) United States Patent
Sharma et al.

(10) Patent No.: US 9,474,102 B2
(45) Date of Patent: Oct. 18, 2016

(54) COMMUNICATION SYSTEM

(75) Inventors: Vivek Sharma, Tokyo (JP); Yassin Aden Awad, Tokyo (JP); Neeraj Gupta, Tokyo (JP); Robert Paterson, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 13/824,645

(22) PCT Filed: Oct. 4, 2011

(86) PCT No.: PCT/JP2011/073283
§ 371 (c)(1),
(2), (4) Date: Mar. 18, 2013

(87) PCT Pub. No.: WO2012/046866
PCT Pub. Date: Apr. 12, 2012

(65) Prior Publication Data
US 2013/0176890 A1    Jul. 11, 2013

(30) Foreign Application Priority Data

Oct. 8, 2010 (GB) .................................. 1017022.3

(51) Int. Cl.
*G08C 17/00* (2006.01)
*H04W 88/04* (2009.01)
(Continued)

(52) U.S. Cl.
CPC ......... *H04W 88/04* (2013.01); *H04B 7/15557* (2013.01); *H04W 52/0232* (2013.01); *H04B 7/2606* (2013.01); *H04W 68/02* (2013.01); *H04W 84/047* (2013.01); *Y02B 60/50* (2013.01)

(58) Field of Classification Search
CPC ............... H04L 2012/5608; H04W 84/12; H04W 88/08; H04W 52/02; H04W 52/0203; H04W 80/04; H04W 88/06; H04W 84/18; H04B 7/2125; H04B 7/2126
USPC ............. 370/310.2, 311, 324, 328, 350, 348, 370/338
See application file for complete search history.

(56) References Cited

U.S. PATENT DOCUMENTS 8,254,323 B2    8/2012 Chun et al.
2006/0187876 A1*    8/2006 Schmidl et al. .............. 370/328
(Continued)

FOREIGN PATENT DOCUMENTS

CN    101340307 A    1/2009
CN    101431790 A    5/2009
(Continued)

OTHER PUBLICATIONS

3GPP TS 36.413 V9.3.0, 3rd Generation Partnership Project; Technical Specification Group Radio Access Network; Evolved Universal Terreslrial Radio Access Network (E-UTRAN); S1 Application Protocol, Release 9, Jun. 2010, pp. 1-241.
(Continued)

*Primary Examiner* — Brenda H Pham
(74) *Attorney, Agent, or Firm* — McGinn IP Law Group, PLLC (57) ABSTRACT

A relay communication system is described in which a relay node communicates with a base station using a sequence of frames, each frame comprising a plurality of sub-frames. The relay node has an energy saving mode in which it monitors for communications from said base station in at least one pre-determined sub-frame of each frame and does not monitor for communication from said base station in at least one other sub-frame of that frame.

12 Claims, 8 Drawing Sheets

(51) Int. Cl.
  *H04B 7/155* (2006.01)
  *H04W 52/02* (2009.01)
  *H04B 7/26* (2006.01)
  *H04W 68/02* (2009.01)
  *H04W 84/04* (2009.01)

(56) References Cited

U.S. PATENT DOCUMENTS

| | | | |
|---|---|---|---|
| 2007/0160027 A1 | 7/2007 | Muqattash et al. | |
| 2008/0031174 A1* | 2/2008 | Saifullah et al. | 370/311 |
| 2008/0181156 A1 | 7/2008 | Ecclesine | |
| 2010/0135159 A1* | 6/2010 | Chun | H04W 72/1289 370/241 |
| 2010/0208660 A1 | 8/2010 | Ji | |
| 2011/0007728 A1* | 1/2011 | Jading et al. | 370/342 |
| 2013/0021935 A1 | 1/2013 | Chun et al. | |

FOREIGN PATENT DOCUMENTS

| | | |
|---|---|---|
| CN | 101584191 A | 11/2009 |
| EP | 2 076 081 A1 | 7/2009 |
| JP | 2010-515334 | 5/2010 |
| JP | 2010-147976 | 7/2010 |
| WO | WO 2007/013934 A2 | 2/2007 |
| WO | WO 2008/114977 A1 | 9/2008 |
| WO | WO 2009/041871 A1 | 4/2009 |
| WO | WO 2010/117313 A1 | 10/2010 |

OTHER PUBLICATIONS

3GPP TS 36.331 V8.11.0, 3rd Generation Partnership Project; Technical Specification Group Radio Access Network,- Evolved Universal Terrestrial Radio Access (E-UTRA); Radio Resource Control (RRC); Protocol Specification Release 8, Sep. 2010, pp. 1-212.

3GPP TS 36.300 V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, pp. 1-183.

NEC Corporation: "Relay node energy saving", R2-104547, 3GPP TSG RAN2 Meeting #71, Madrid, Spain, Aug. 23-27, 2010.

International Search Report in PCT/JP2011/073283 dated Jan. 19, 2012.

Japanese Office Action dated Jan. 29, 2014, with English translation.

Chinese Office Action dated Apr. 1, 2015 with an English translation thereof.

\* cited by examiner

COMMUNICATION SYSTEM

TECHNICAL FIELD

The present invention relates to a communication system and to components thereof for providing relay services to mobile or fixed communication devices. The invention has particular but not exclusive relevance to relay services used in LTE-Advanced as currently defined in 3GPP standards documentation TS 36.413 V 9.3.0 and TS 36-300 V 10.0.0.

BACKGROUND ART

Relaying is considered for LTE-Advanced as a tool to improve, for example, the coverage of high data rates for User Equipment (UE), group mobility, temporary network deployment, the cell edge throughput and/or to provide coverage in new cell areas. E-UTRAN supports relaying by having a Relay Node (RN) wirelessly connected to a base station (eNB) (referred to as a Donor eNB (DeNB)). In addition to serving its own 'donor' cell, the DeNB serves the RN, via a modified version of the E-UTRA radio interface. The modified interface is referred to as the 'Un' interface or the 'RN-Un' interface.

Each RN is provided with many aspects of a base station's functionality and is therefore capable of acting as a base station serving user equipment in its own 'relay' cell via a wireless interface referred to as the 'RN-Uu' interface. From the perspective of the user equipment in the relay cell, therefore, the RN essentially appears to be a conventional LTE base station. In addition to the base station functionality, however, the RN also supports a subset of the UE functionality including, for example, many aspects of the physical layer, layer-2, radio resource control (RRC), and non access stratum (NAS) functionality, to allow it to connect wirelessly to a Donor eNB (DeNB).

The DeNB is capable of handling communication 'directly' to and from user equipment camped in its own cell via a conventional 'Uu' interface between the DeNB and the user equipment. The DeNB is also capable of handling communication 'indirectly' with user equipment camped in the relay cell, via the RN-Un interface, the RN, and the RN-Uu interface.

As those skilled in the art will understand, conventional eNBs have the capability of interconnecting with one another via an interface referred to as the 'X2' interface. The eNBs also connect to a core network comprising an Evolved Packet Core (EPC) by means of an interface referred to as the 'S1' interface and, more specifically, to a (MME) Mobility Management Entity (MME) of the EPC via an 'S1-MME' interface and to a Serving Gateway (S-GW) by means of an 'S1-U' interface.

The DeNB is therefore required to provide S1 and X2 proxy functionality between the RN and other network nodes (other eNBs, MMEs and S-GWs) meaning that, depending on the context, the DeNB appears as an MME (for S1), an eNB (for X2) and an S-GW, to the RN. Thus, in addition to terminating the conventional radio protocols of the modified E-UTRA radio interface (RN-Un), the RN is also capable of terminating the protocols of the S1 and X2 interfaces.

When the RN is not serving any UEs (for example at night when fewer UEs are active), however, the RN keeps itself active over both the RN-Un and the RN-Uu interface. This is undesirable because the maintenance of the interfaces expends energy unnecessarily.

The present invention aims to provide an improved communication system and improved components of the communication system, which overcome or at least alleviate the above issues.

The inventors have considered a number of possible ways to achieve this objective but have found that whilst there are existing proposals for Energy Saving Modes (ESMs) to reduce the energy consumption of eNBs and UEs, the implementation of ESMs in the case of RNs is not straightforward.

According to one potential solution conceived by the inventors, an RN reduces energy consumed over the RN-Un interface by moving into a low energy consumption idle mode when it determines that the UE's in its relay cell are inactive (or have remained so for a predetermined period of time). However, whilst this does indeed reduce energy consumption, the transition into the idle mode results in the loss of the S1/X2 context. This is not ideal because it is preferable for the RN to maintain the S1/X2 context in order to continue to receive signals from the DeNB (e.g. acting as an MME (for S1) or an eNB (for X2)) correctly.

According to another potential solution conceived by the inventors, an RN uses a discontinuous reception (DRX) mechanism, similar to that agreed at the 3GPP for implementation in UEs, for reducing the energy consumed over the RN-Un interface. However, whilst this solution also provides significant benefits in terms of reduced energy consumption, it also is not without its issues. These issues arise, in part, because of the need for the RN to support paging from the DeNB to idle mode UEs served by the RN and, in part, because of the need to maintain other radio bearers established for Operations, Administration, and Maintenance (OAM) purposes, which bearers remain present even when there are no active UEs in the relay cell.

More specifically, even where all UEs in the relay cell are in idle mode, a paging message (e.g. a S1-AP: Paging message) can still be received at any time over the Un interface, with one message being received for each paged UE. To receive paging messages, a UE in idle mode monitors the Physical Downlink Control Channel (PDCCH) for a Paging Radio Network Temporary Identifier (P-RNTI) used to indicate paging.

A P-RNTI indicating a paging message may be transmitted at predefined Paging Occasions (POs) within a Paging Frame (PF) (a single radio frame) that may contain one or more Paging Occasion(s). Currently, for example, up to four POs are allowed in each paging frame (PF) for an eNB. When DRX is used, the UE need only monitor once per DRX cycle. If the terminal detects a P-RNTI when it wakes up from its DRX cycle, it will process the corresponding paging message.

The UE derives the PF to monitor using the following formula:

$$SFN \bmod T = (T \operatorname{div} N)*(UE\_ID \bmod N)$$

where:
- $N = \min[T, nB]$ (i.e. if nB<T then N=nB otherwise N=T);
- UE_ID=IMSI mod 1024;
- SFN is the Cell System Frame Number;
- T is the DRX cycle for the UE;
- nB is a parameter broadcast in a system information block (SIB2) which may be equal to a multiple or fraction of T (e.g. nB=4T, 2T, T, T/2, T/4, T/8, T/16, or T/32);
- IMSI is the International Mobile Subscriber Identity for the UE; and
- UE_ID is a UE identifier based on the IMSI.

Accordingly, the eNB must be able to send a paging message in every radio frame, and hence the same requirement applies to the RN, over the RN-Uu interface. However, paging delays can occur, if the RN operates in a DRX mode over the RN-Un interface during a period that a paging message for a destination UE in the relay cell is sent by MME to the DeNB. On receipt of such a message, the DeNB must wait until the RN begins to monitor the PDCCH and comes out of DRX, before the paging message can be transmitted to the RN. Then, when the RN has received the paging message, it also has to wait until the destination UE monitor the PDDCH and wakes up. If the UE has missed an opportunity to receive the paging message by a narrow margin, the resulting delay can be particularly significant. Such a delay is undesirable as it can result in a prolonged call set up time (calling party delay). Effectively, allowing the RN to use DRX over the RN-Un interface can result in a doubling, or near doubling, of the paging delay for a UE relative to the delay experienced when the UE is paged directly from a conventional eNB, or from an RN that does not employ DRX.

DISCLOSURE OF INVENTION

According to one aspect of the present invention there is provided a communications node for a communication system, the communications node comprising: means for communicating with a further communications node using a sequence of frames, each frame comprising a plurality of sub-frames; means for obtaining information identifying the at least one pre-determined sub-frame of each frame; and means for initiating an energy saving mode in which the at least one pre-determined sub-frame of each frame is monitored for communications from said further communications node and at least one other sub-frame of each frame is not monitored for communications from said further communications node.

It will be appreciated that any number of suitable mechanisms may be used to reduce energy consumption when the sub-frames are not being monitored including, for example, switching off one or more reception and/or transmission circuitry modules, disengaging an antenna, receiving but not processing incoming signals or the like.

According to another aspect of the present invention there is provided a communications node for a communication system, the communications node being operable to communicate with a further communications node using a sequence of frames, each frame comprising a plurality of sub-frames, and having an energy saving mode in which said communications node monitors for communications from said further communications node in at least one pre-determined sub-frame of each frame and does not monitor for communication from said further communications node in at least one other sub-frame of each frame.

According to another aspect of the present invention there is provided a communications node for a communication system, the communications node comprising: means for communicating with a plurality of mobile devices over a first interface; means for communicating with a further communications node over a second interface; means for operating in an energy saving mode in which said communications node monitors for communication from said further communications node in at least one pre-determined sub-frame and does not monitor for communication from said further communications node in at least one other sub-frame; means for obtaining an indication of the at least one pre-determined sub-frame; and means for determining when the energy saving mode should be initiated and for initiating said energy saving mode based on activity of said mobile devices over said first interface.

According to another aspect of the present invention there is provided a system, the method comprising: communicating with a further communications node using a sequence of frames, each frame comprising a plurality of sub-frames; obtaining information identifying the at least one pre-determined sub-frame of each frame; and initiating an energy saving mode in which the at least one pre-determined sub-frame of each frame is monitored for communications from said further communications node and at least one other sub-frame of each frame is not monitored for communications from said further communications node.

According to another aspect of the present invention there is provided a method performed by a communications node of a communication system, the method comprising: communicating with a plurality of mobile devices over a first interface; communicating with a further communications node over a second interface; obtaining an indication of the at least one pre-determined sub-frame for use in an energy saving mode, in which said energy saving mode said communications node monitors for communication from said further communications node in at least one pre-determined sub-frame and does not monitor for communication from said further communications node in at least one other sub-frame; determining that said energy saving mode should be initiated based on activity of said mobile devices over said first interface; and initiating said energy saving mode based on said determination.

According to another aspect of the present invention there is provided a communications node for a communication system, the communications node comprising: means for communicating with a further communications node using a sequence of frames, each frame comprising a plurality of sub-frames; and means for determining when said further communications node is in an energy saving mode wherein: said communicating means is operable, when said further communications node is determined to be in said energy saving mode, to preferentially transmit signals to the further communications node in at least one pre-determined sub-frame of each frame.

According to another aspect of the present invention there is provided a communications node for a communication system, the communications node being operable: to communicate with a further communications node using a sequence of frames, each frame comprising a plurality of sub-frames; and to determine when said further communications node is in an energy saving mode wherein said communications node is operable, when said further communications node is determined to be in said energy saving mode, to preferentially transmit signals to the further communications node in at least one pre-determined sub-frame of each frame.

According to another aspect of the present invention there is provided a method performed by a communications node of a communication system, the method comprising: communicating with a further communications node using a sequence of frames, each frame comprising a plurality of sub-frames; determining when said further communications node is in an energy saving mode; and when said further communications node is determined to be in said energy saving mode, preferentially transmitting signals to the further communications node in at least one pre-determined sub-frame of each frame.

The invention also provides corresponding methods and computer software products that may be provided on a carrier signal or on a recording medium.

The text of the abstract filed herewith is repeated here as part of the specification: A relay communication system is described in which a relay node communicates with a base station using a sequence of frames, each frame comprising a plurality of sub-frames. The relay node has an energy saving mode in which it monitors for communications from said base station in at least one pre-determined sub-frame of each frame and does not monitor for communication from said base station in at least one other sub-frame of that frame.

BRIEF DESCRIPTION OF DRAWINGS

Embodiments of the invention will now be described, by way of example only, with reference to the attached figures in which.

BEST MODE FOR CARRYING OUT THE INVENTION

Overview

Figure 1:
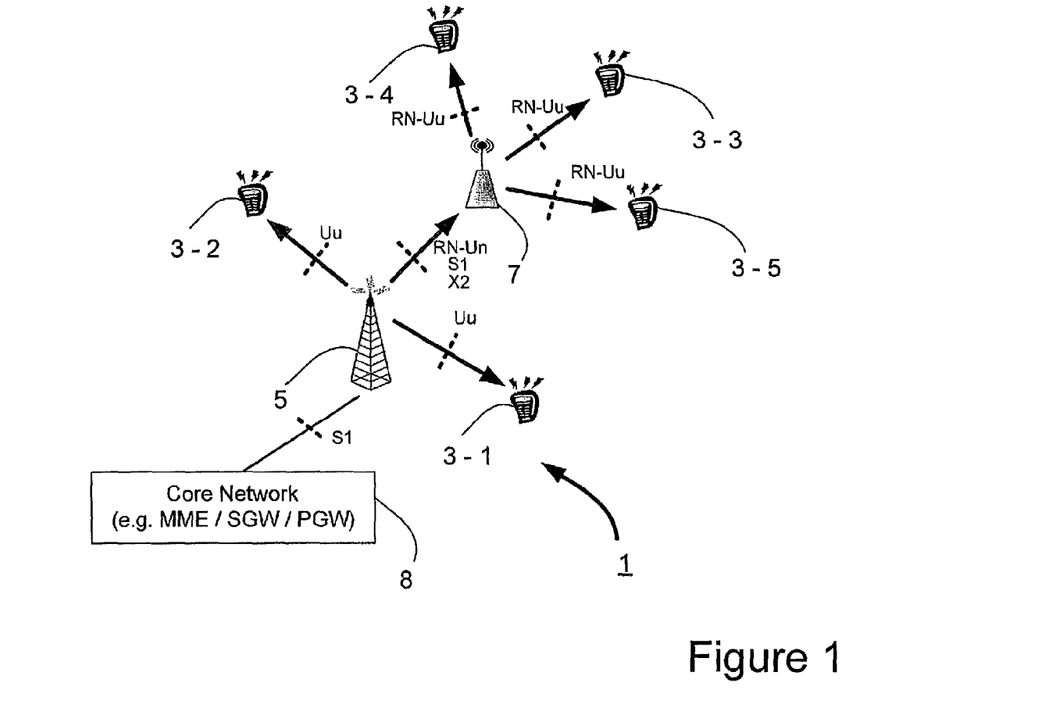
FIG. 1 schematically illustrates a mobile telecommunication system of a type to which the described embodiments are applicable.

FIG. 1 schematically illustrates a mobile (cellular) telecommunication system 1 including user equipment 3, comprising a plurality of mobile telephones 3-1 to 3-5 served by a donor base station 5. The telecommunication system 1 also comprises a relay node 7 and a core network 8. The relay node 7 connects wirelessly to the donor base station 5 via an RN-Un interface and the eNB connects to the core network 8 via an S1 interface. The core network 8 comprises amongst other things, a mobility management entity (MME), a serving gateway (SGW) and a Packet Data Network (PDN) Gateway (PGW).

Mobile telephones 3-1 and 3-2 (hereafter referred to as Direct MTs) are each registered directly with the donor base station 5, and connect to it via a conventional Uu interface. Mobile telephones 3-3, 3-4 and 3-5 (hereafter referred to as Relay MTs) are each registered with the relay node 7, and connect to it via an RN-Uu interface. Accordingly, users of mobile telephones 3-1 and 3-2 can communicate with other users via the donor base station 5 and the core network 8. Users of mobile telephones 3-3 to 3-5 can communicate with other users via the relay node 7 and the donor base station 5 and the core network 8.

Figure 2:
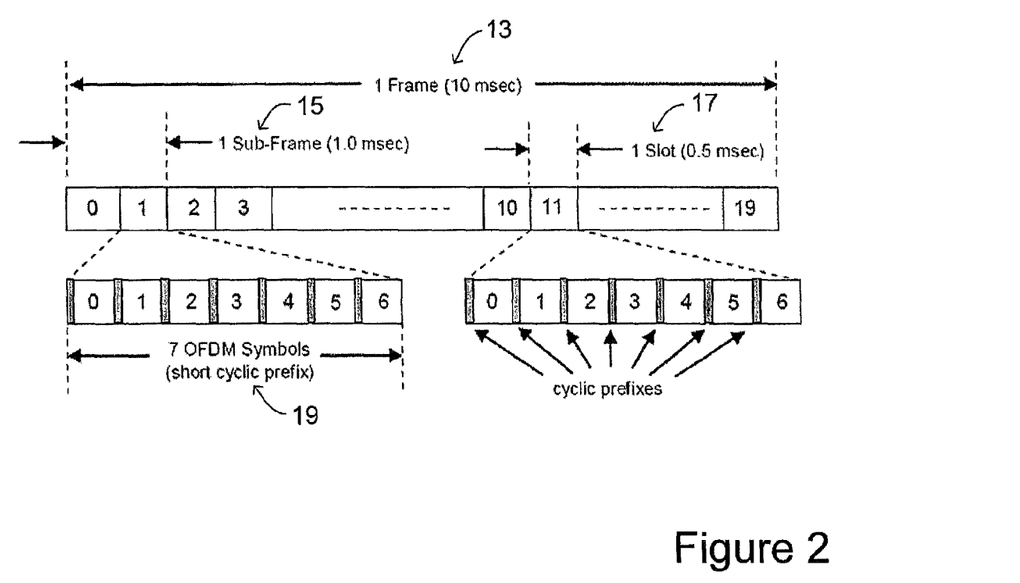
FIG. 2 schematically illustrates a generic frame structure used in communications over the wireless links of the system shown in FIG. 1.

An Orthogonal Frequency Division Multiple Access (OFDMA) technique is used to allow the Direct MTs (3-1 and 3-2) and the relay node 7 to receive data respectively over the Uu and the RN-Un interfaces with the base station 5, and to allow the Relay MTs (3-3 to 3-5) to receive data over the RN-Uu interface with the relay node 7. FIG. 2 illustrates a generic frame structure agreed for LTE Rel 8 communications over the air interfaces with the base station 5. As shown, one frame 13 is 10 msec long and comprises 10 sub-frames 15, each of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system.

The relay node 7 is configured to implement Energy Saving Modes (ESMs) to reduce its energy consumption over the RN-Un and RN-Uu interfaces (RN-Un ESM and RN-Uu ESM respectively) while the Relay MTs 3-3, 3-4, and 3-5 in its relay cell are inactive (e.g. in an idle state). The donor base station 5 maintains the context of the Relay MTs 3-3 to 3-5 so that it can perform its proxy function as a core network device. Accordingly, the donor base station 5 remains aware of the active/idle status of the Relay MTs 3-3 to 3-5.

In this embodiment, the RN-Uu ESM implemented by the relay node 7 is essentially the same as the ESM procedure currently proposed at 3GPP for implementation in conventional eNBs to reduce their energy usage over the associated Uu interface with the mobile telephones they serve directly. More specifically, as those skilled in the art will readily understand, the relay node 7 employs the procedures proposed for intra-eNB energy saving, in EUTRA networks, so that a single cell can operate in an energy saving mode when resource utilisation is sufficiently low; based, for example, on traffic monitoring with regard to Quality of Service (QoS) and coverage assurance.

The RN-Un ESM implemented by the relay node 7 involves the relay node 7 entering the energy saving mode, when the Relay MTs 3-3 to 3-5 that it serves are inactive, and monitoring a preconfigured downlink (DL) sub-frame 15 or set of DL sub-frames 15 of each frame 13. In accordance with the RN-Un ESM, the donor base station 5, schedules any S1 signalling and any Operations, Administration, and Maintenance (OAM) signalling over these pre-configured sub-frames 15 only.

In this embodiment, configuration of the sub-frames 15 to be monitored when the relay node 7 is in the RN-Un ESM is achieved by means of Radio Resource Control (RRC) signalling Specifically, the donor base station 5 informs the relay node 7, using the RRC signalling, of the number of each sub-frame 15 that will be scheduled routinely for any S1/OAM traffic on the downlink, when the RN-Un ESM is activated.

In this embodiment, the relay node 7 explicitly informs the donor base station 5 that the RN-Un ESM should be activated when the relay node determines that no RRC connection exists for any mobile terminal 3 in the relay cell.

Accordingly, the relay node 7 is advantageously able to enter the RN-Un ESM to reduce energy consumption during a proportion of each radio frame 13. Effectively, therefore, the relay node 7 is able to 'sleep' up to a maximum of 9 sub-frames 15 (when only a single sub-frame 15 is pre-configured for S1/OAM signalling). Moreover, by combining the use of the RN-Un ESM with the proposed RN-Uu ESM further benefits in terms of increased reductions in energy consumption can potentially be achieved.

A determination of when a communications node is in energy saving mode may be based on a time elapsed from a communications activity fulfilling a predetermined criterion.

Base Station

Figure 3:
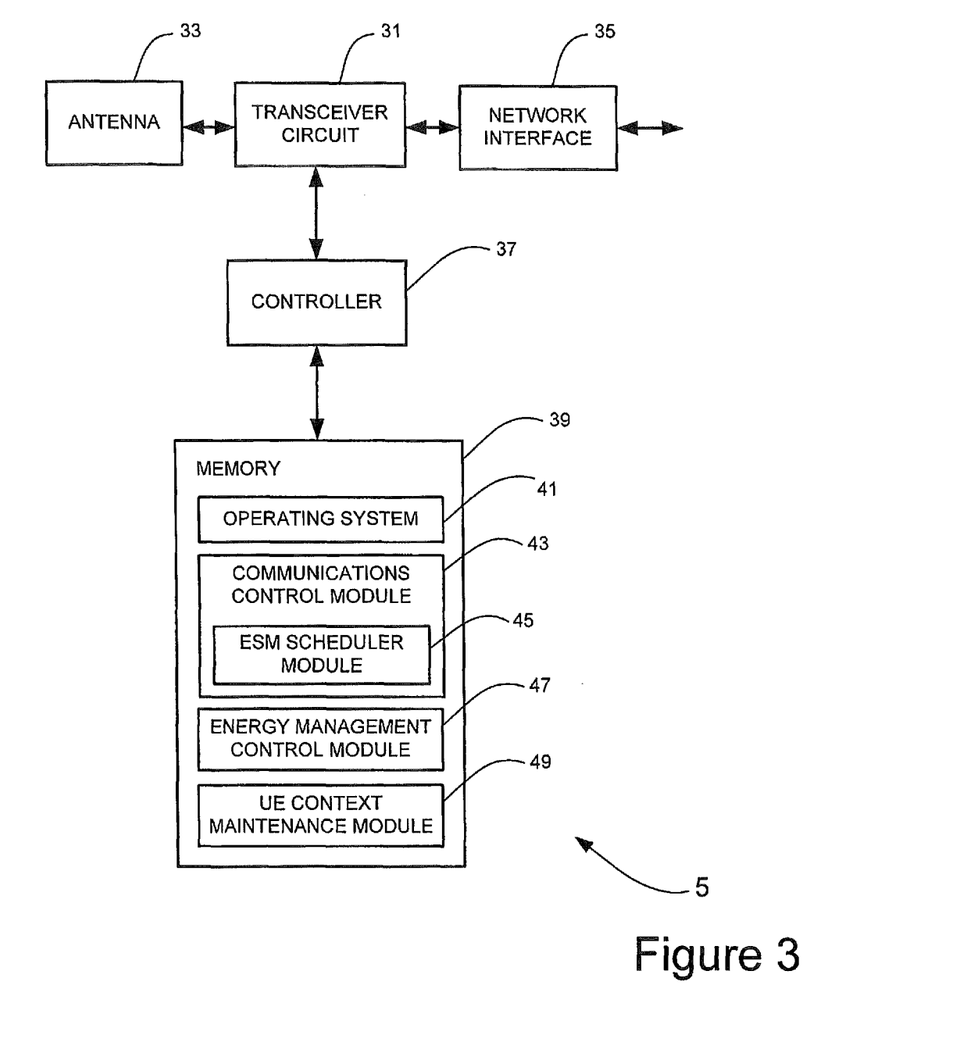
FIG. 3 is a block diagram illustrating the main components of the base station illustrated in FIG. 1.

FIG. 3 is a block diagram illustrating the main components in the donor base station 5 shown in FIG. 1. As shown, the donor base station 5 includes a transceiver circuit 31 which is operable to transmit signals to, and to receive signals from, the Direct MTs 3-1 and 3-2 over a conventional Uu interface, and the relay node 7 over the RN-Un interface (and S1 or X2 interface where appropriate) via at least one antenna 33. The donor base station 5 is also operable to transmit signals to and to receive signals from the core network 8 via a network interface 35. The operation of the transceiver circuit 31 is controlled by a controller 37 in accordance with software stored in a memory 39.

The software includes, among other things, an operating system 41, a communications control module 43 including an ESM scheduler module 45, an energy management control module 47, and a UE context maintenance module 49.

The communications control module 43 is operable to control communication with the Direct MTs 3-1 and 3-2 and the relay node 7 including, for example, allocation of resources to be used by the transceiver circuit 31 in its communications with each of the Direct MTs 3-1 and 3-2 and with the relay node 7. The communications control module 43 also schedules the times for the transmission of downlink data to the Direct MTs 3-1 and 3-2 and the relay node 7. Specifically, the ESM scheduler module 45 of the communications control module 43 schedules the pre-configured sub-frames 15 to be used for S1/OAM signalling to the relay node 7 when the relay node 7 is in the RN-Un ESM.

The energy management control module 47 manages the configuration of the sub-frames 15 used when the relay node 7 is operating in the RN-Un ESM. On set up of the connection with the relay node 7, the energy management control module 47 signals the identity (e.g. sub-frame number) of each sub-frame 15 that will be scheduled for S1/OAM signalling to the relay node 7 when the relay node 7 is in the RN-Un ESM. The energy management control module 47 controls initiation and termination of the base station side ESM procedures and, in particular, initiation and termination of the period during which S1/OAM signalling is achieved using the pre-configured sub-frames 15 in accordance with the RN-Un ESM. On receipt of signalling from the relay node 7, to request initiation of the base station side ESM procedures, the energy management control module 47 initiates the RN-Un ESM at the donor base station 5.

UE context maintenance module 49 maintains the context of the Relay MTs 3-3 to 3-5 to allow the donor base station 5 to carry out device identity mapping, and to perform its proxy function as a core network device.

Relay Node

Figure 4:
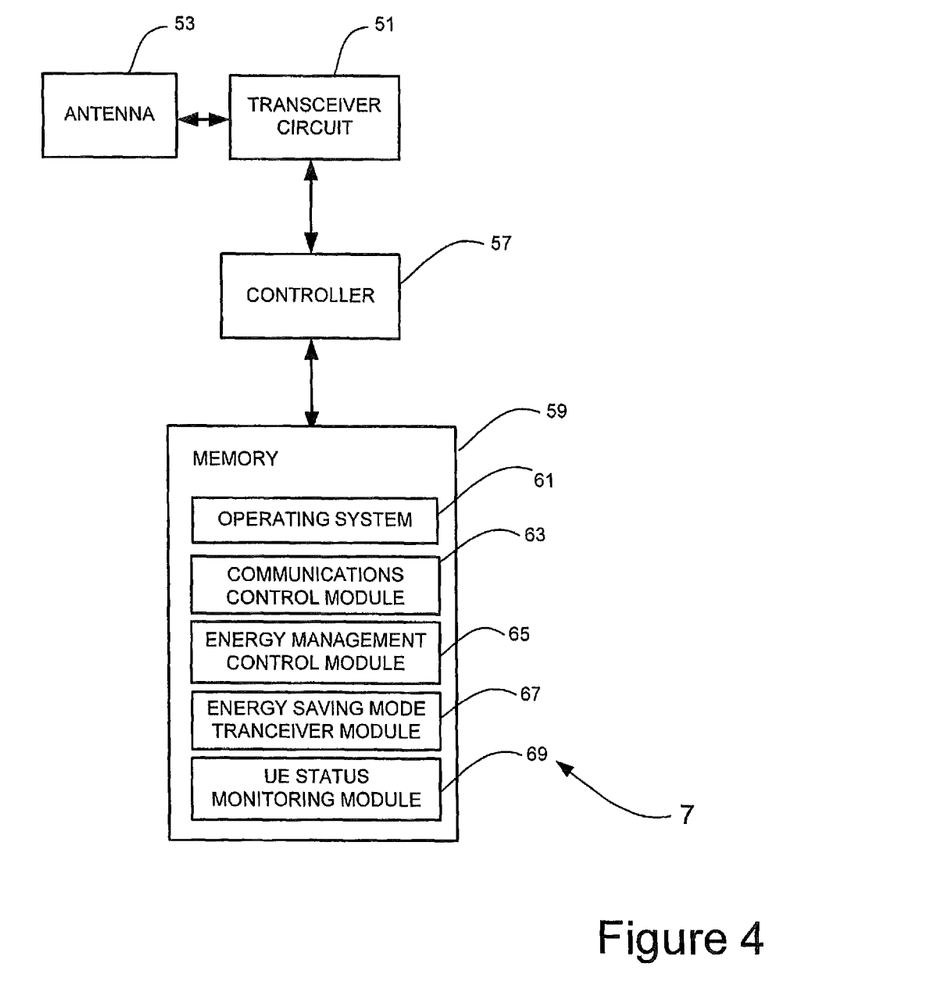
FIG. 4 is a block diagram illustrating the main components of the relay node illustrated in FIG. 1.

FIG. 4 schematically illustrates the main components of the relay node 7 shown in FIG. 1. The relay node 7 may be a fixed communications node like a donor base station 5 or may itself be a mobile device. Indeed, some mobile telephones 3 may provide relay services and therefore act as relay nodes 7. It will be appreciated, therefore, that whilst the ESMs implemented by the relay node 7 are of general benefit in terms of reduced energy consumption and hence reduced carbon footprint, they are of particular benefit when the relay node 7 is a mobile device powered by a battery.

As shown, the relay node 7 includes a transceiver circuit 51 which is operable to transmit signals to, and to receive signals from, Relay MTs 3-3 to 3-5 over the RN-Uu interface, and the donor base station 5 over the RN-Un interface (and S1/X2 interfaces where appropriate) via at least one antenna 53. The operation of the transceiver circuit 51 is controlled by a controller 57 in accordance with software stored in a memory 59.

The software includes, among other things, an operating system 61, a communications control module 63, an energy management control module 65, an energy saving mode transceiver module 67, and a UE status monitoring module 69.

The communications control module 63 is operable to control communication with the Relay MTs 3-3 to 3-5 and the relay node 7 including, for example, allocation of resources to be used by the transceiver circuit 51 in its communications with each of the Relay MTs 3 and with the base station 5. The communications control module 63 also schedules the times for the transmission of appropriate sub-frames 15 to relay associated data to the Relay MTs 3-3 to 3-5.

The energy management control module 65 controls initiation and termination of the energy saving mode at the relay node 7. While the relay node 7 is in the RN-Un ESM the energy management control module 65 manages the activation ('wake up') of the relay node 7 to monitor the sub-frames 15 pre-configured for the RN-Un ESM and the return to a low energy consumption ('sleep') mode by the relay node 7 during the other sub-frames 15. On set up of the connection with the donor base station 5, the energy management control module 65 controls reception of the signals identifying each sub-frame 15 pre-configured for S1/OAM signalling to the relay node 7 when the relay node 7 is in the RN-Un ESM. The energy management control module 65 stores information identifying the pre-configured sub-frames 15 in memory for future reference.

The energy saving mode transceiver module 67 receives S1/OAM signalling, such as S1 paging messages or the like, transmitted during the pre-configured sub-frames 15 and relays the signalling to the appropriate Relay MTs 3-3 to 3-5.

The UE status monitoring module 69 monitors the active/idle status of the Relay MTs 3-3 to 3-5 to determine when the criteria for entry to the RN-Un ESM is to be initiated. On determination that the criteria for entry to the RN-Un ESM have been met, for example because all Relay MTs 3-3 to 3-5 are in an idle state (or have been for a predetermined period of time), the energy management control module 65 signals the donor base station 5 to begin the base station side ESM procedures and, in particular, begin using the pre-configured sub-frames 15 in accordance with the RN-Un ESM. The energy management control module 65 then initiates the RN-Un ESM at the relay node 7.

ESM Procedures

The procedures used by the donor base station 5 and the relay node 7, to set up, initiate and terminate the energy saving procedures will now be described by way of example only. These procedures break down broadly into:

ESM configuration procedures for configuring the sub-frames 15 to use when the RN-Un ESM is activated;

ESM activation procedures for activating the RN-Un ESM at the relay node 7 and the donor base station 5; and ESM termination procedures for terminating the RN-Un ESM.

ESM Configuration

Figure 5:
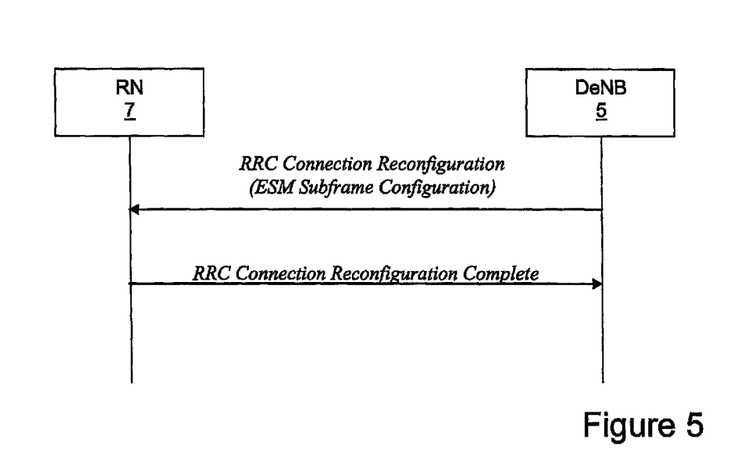
FIG. 5 is a flow diagram illustrating, in general terms, an exemplary procedure for configuring an energy saving mechanism for the relay node of FIG. 4.

FIG. 5 is a flow diagram illustrating, in general terms, an exemplary procedure for configuring an RN-Un ESM for the relay node 7.

During the initial phase when a connection is set up between the relay node 7 and the donor base station 5, as seen in FIG. 5, the donor base station 5 signals the identity (e.g. sub-frame number) of the sub-frames 15 that will be pre-configured for S1/OAM signalling in the event the relay node 7 enters its RN-Un ESM using RRC signalling.

Specifically, in this embodiment, the donor base station 5 signals the identity of the pre-configured sub-frames 15 in an RRC Connection Reconfiguration message and, more specifically, the first RRC Connection Reconfiguration message. The relay node 7 effectively confirms successful receipt of the configuration information when it responds with an RRC Connection Reconfiguration Complete message.

Figure 6:
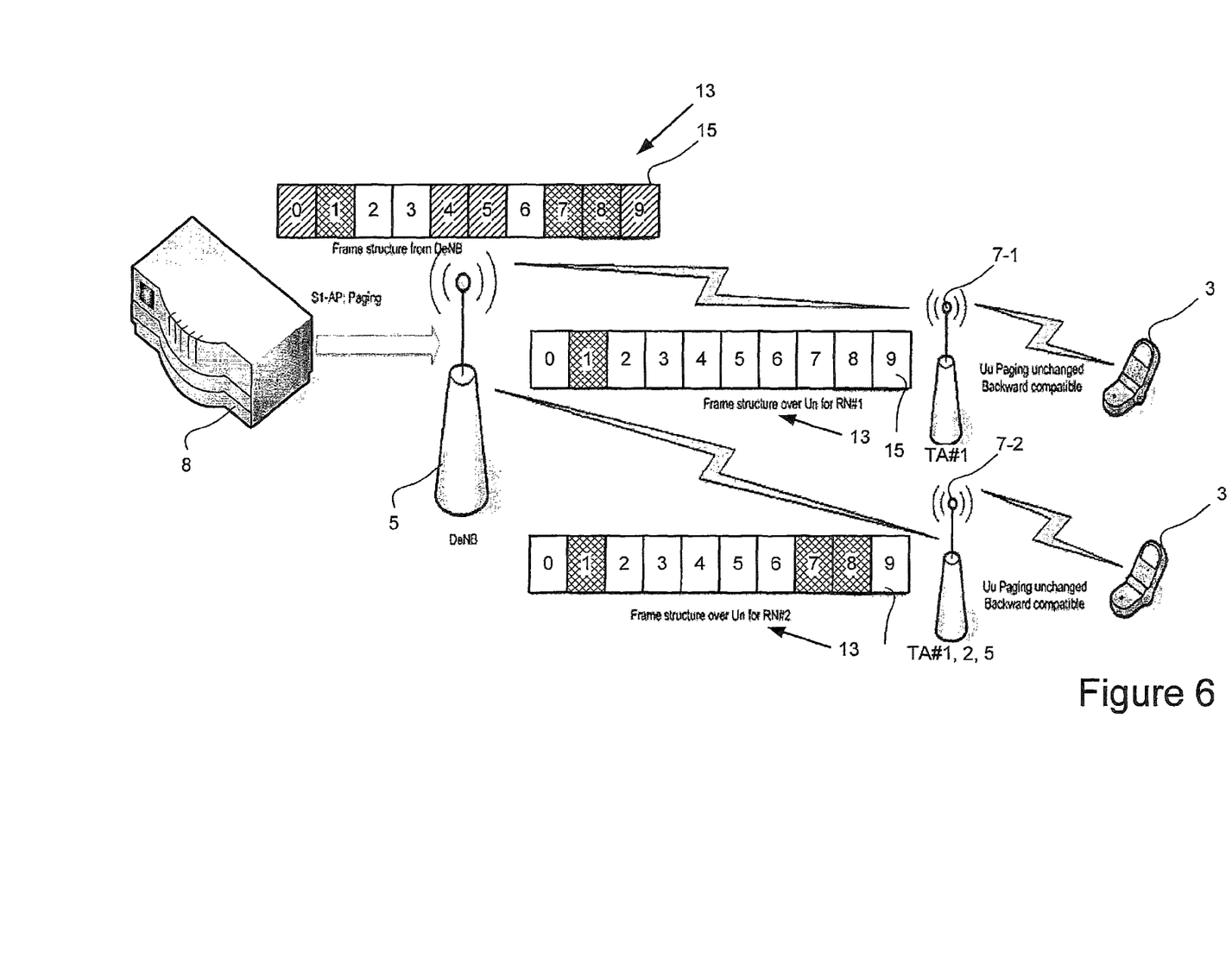
FIG. 6 illustrates, in overview, flexible configuration of energy saving mechanisms for different relay nodes using the process of FIG. 5.

FIG. 6 illustrates some of the benefits of using this configuration procedure.

In the example of FIG. 6 there are two relay nodes 7-1 and 7-2 controlled by a donor base station 5, and all relay mobile telephones 3 in the relay cells of the relay nodes 7 are in idle mode. The first relay node 7-1 is part of TA#1 and the second relay node 7-2 is part of TA#1, TA#2, and TA#5. Accordingly, the second relay node 7-2 is likely to receive more S1 paging messages over the RN-Un interface than the first relay node 7-1.

Using the configuration procedure described above, the donor base station 5 pre-configures one sub-frame 15 (sub-frame #1) for monitoring by the first relay node 7-1 and a further two sub-frames 15 (sub-frames #7 and #8) in addition to sub-frame #1 for monitoring by the second relay node 7-2. When the relay nodes 7 are in their respective RN-Un ESMs, therefore, the donor base station 5 uses sub-frame #1 for paging the relay mobile telephones 3 of TA#1 and sub-frames #7 and #8 for paging the relay mobile telephones 3 of TA#2 and TA#5. Accordingly, the first relay node 7-1 wakes up less regularly during each frame 13 than the second relay node 7-2.

The configuration procedure described above, therefore, provides flexibility to configure different sub-frames 15 (or groups of sub-frames 15) to take account of the different likely S1 paging levels.

This is just one example, which illustrates the benefits of this flexibility to pre-configure the sub-frames for use in the RN-Un ESM as required. The flexibility can also be utilised where tighter delay requirements need to be met for paging. Moreover, this flexibility can be used to allow S1 traffic and OAM traffic to be sent in different pre-configured sub-frames 15.

ESM Activation

Figure 7:
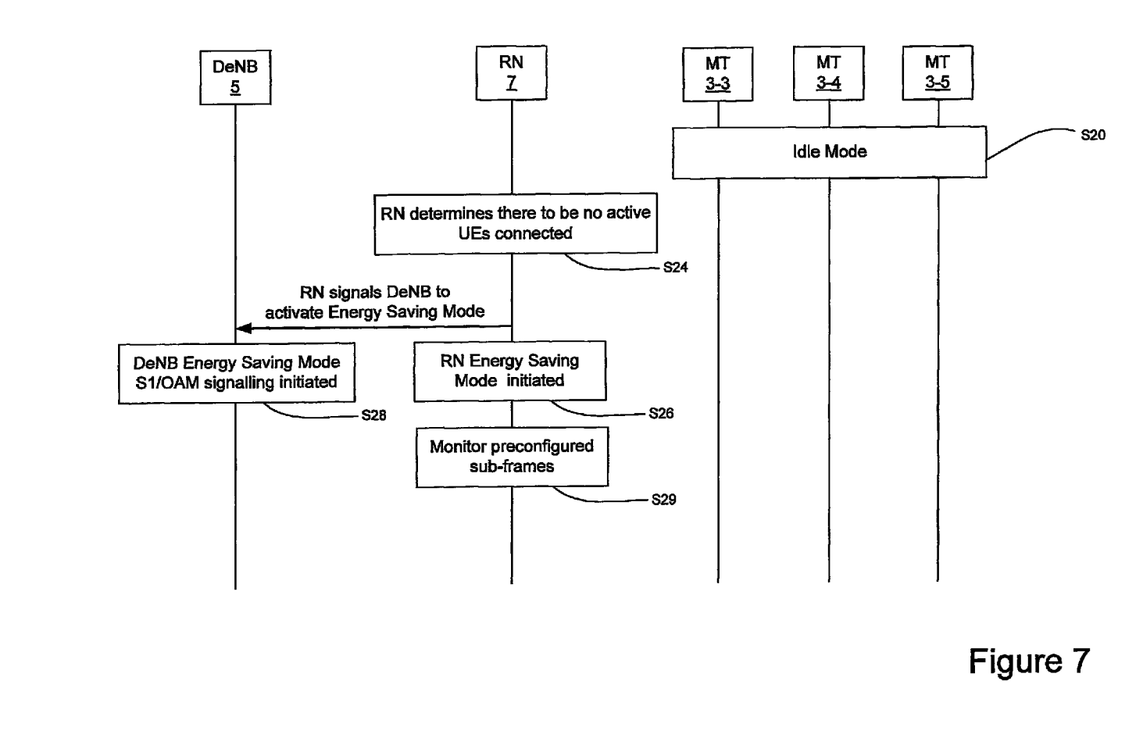
FIG. 7 is a flow diagram illustrating, in general terms, an exemplary procedure for initiating an energy saving mechanism for the relay node of FIG. 4.

FIG. 7 is a flow diagram illustrating, in general terms, an exemplary procedure for initiating entry to the RN-Un ESM.

As seen in FIG. 7 when the Relay MTs 3-3 to 3-5 are all inactive (e.g. at S20), the relay node 7 of this embodiment determines that there are no active connections at S24. The relay node 7 responds to this determination by generating a signal (e.g. an RRC message) to request that the donor base station 5 initiate the base station side procedures for the RN-Un ESM. The relay node 7 then enters the RN-Un ESM (at S26) and the donor base station 5 initiates the base station side procedures for the RN-Un ESM (at S28) substantially simultaneously after which S1/OAM signalling is transmitted to the relay node 7 using only the pre-configured sub-frames 15 for that relay node 7.

Once the RN-Un ESM is activated the relay node 7 remains in a low energy consumption ('sleep') state for the sub-frames 15 that have not been preconfigured for S1/OAM signalling but 'wakes up' to monitor the sub-frames that have been preconfigured for S1/OAM signalling (at S29).

Activation of the RN-Un ESM via explicit signalling such as this is particularly beneficial where the base station's proxy function is provided as separate hardware (e.g. a conventional rel-8 rel-9 eNB with upgraded RRC and MAC with separate hardware to perform the proxy function) because the exact relative timing of UE context clearing in the base station 5 and the relay node 7 cannot be ascertained easily.

ESM Termination

Figure 8:
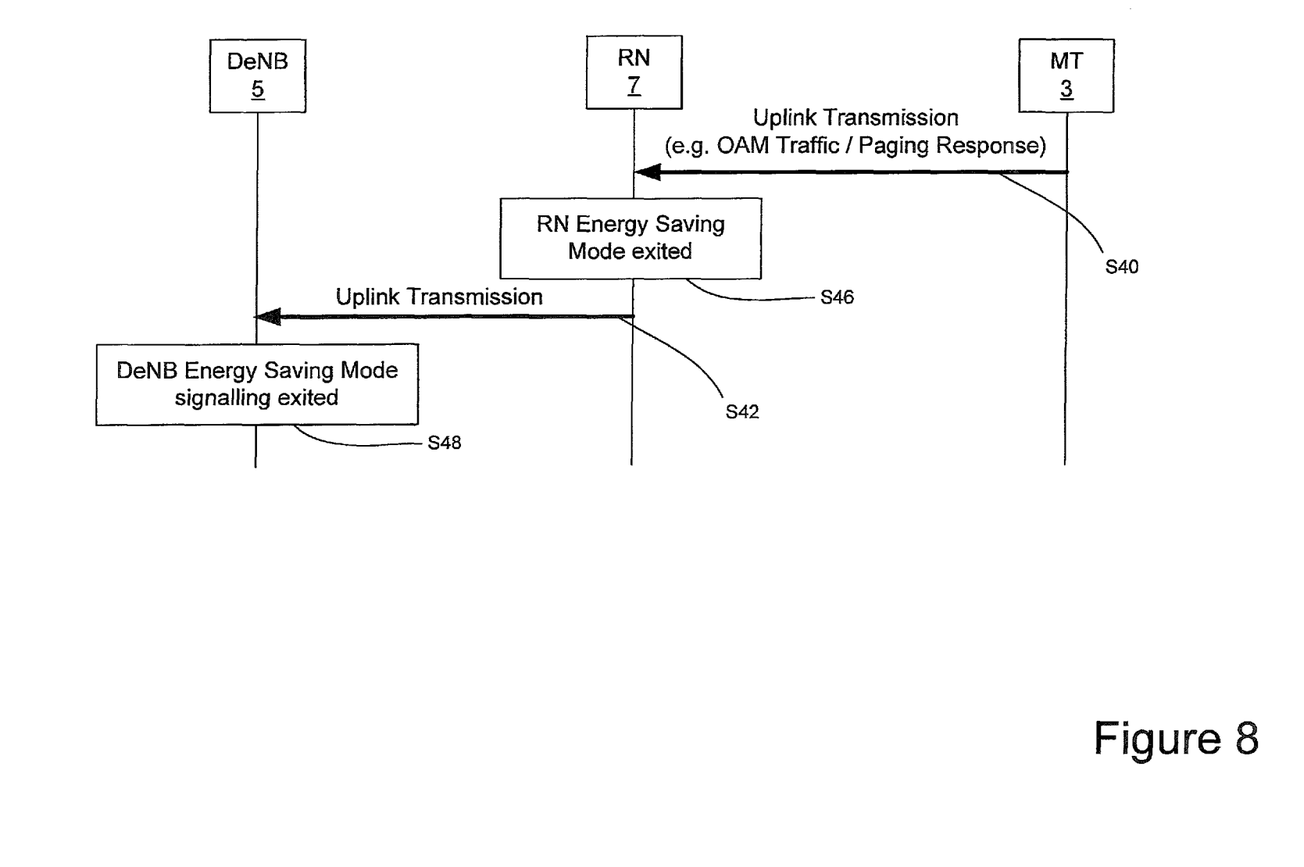
FIG. 8 is a flow diagram illustrating, in general terms, an exemplary procedure for terminating an energy saving mechanism for the relay node of FIG. 4.

FIG. 8 is a flow diagram illustrating, in general terms, an exemplary procedure for terminating the RN-Un ESM.

When the relay node 7 is in the RN-Un ESM and one of the Relay MTs 3 begins sending uplink traffic, for example, OAM traffic, when responding to a paging message, or the like (at S40), detection of the uplink traffic by the relay node 7 triggers exit from the RN-Un ESM over the RN-Un interface (at S46). The relay node 7 relays the uplink traffic to the donor base station 5 (at S42) which, in turn, triggers the donor base station 5 to cease sending the S1/OAM signaling in the pre-configured sub-frames (at S48) in accordance with the RN-Un.

Accordingly, by using the RN-Un ESM proposed herein, the relay node 7 is advantageously able to enter the RN-Un ESM to reduce energy consumption significantly during a proportion of each radio frame 13. The use of the RN-Uu ESM procedure provides further benefits in terms of increased reductions in energy consumption.

Modifications and Alternatives

A detailed embodiment has been described above. As those skilled in the art will appreciate, a number of modifications and alternatives can be made to the above embodiment whilst still benefiting from the inventions embodied therein.

It will be appreciated, for example, that whilst activation of the RN-Un ESM via explicit signalling is particularly beneficial where the base station's proxy function is provided as separate hardware, activation may be performed implicitly. In another embodiment for example, the donor base station 5 advantageously makes use of its awareness of the context of the Relay MTs 3-3 to 3-5 to determine, implicitly, when the RN-Un ESM should be activated at the donor base station side of the RN-Un interface, and begins to use the pre-configured sub-frames for any S1/OAM traffic accordingly. An exemplary activation procedure which might be used in such an embodiment is illustrated in FIG. 9.

Figure 9:
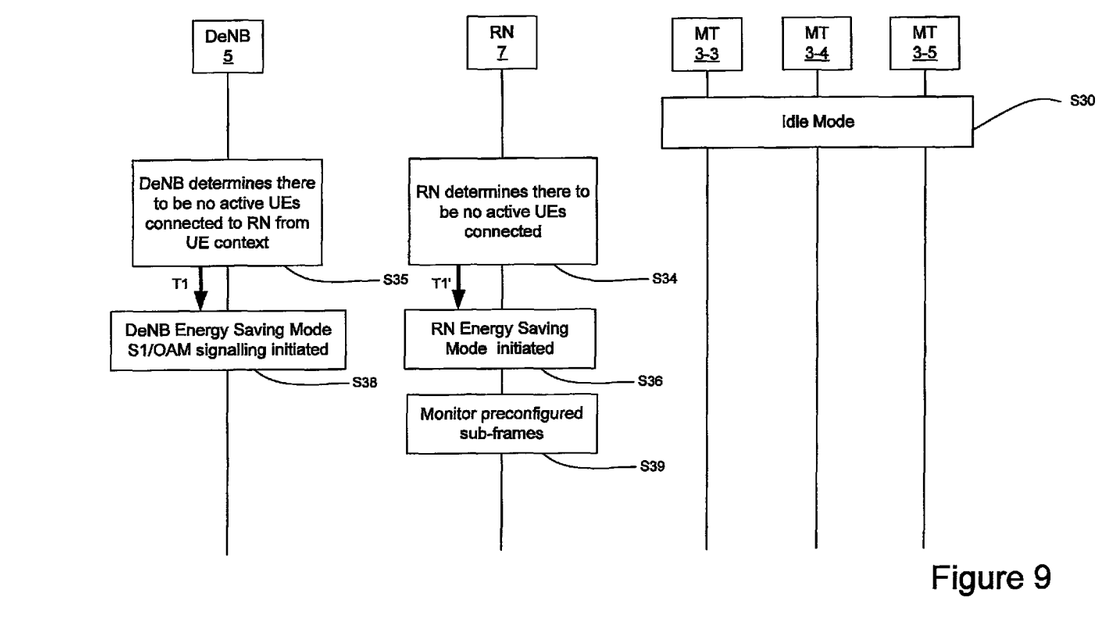
FIG. 9 is a flow diagram illustrating, in general terms, a further exemplary procedure for initiating an energy saving mechanism for the relay node of FIG. 4.

As shown in FIG. 9, when the Relay MTs 3-3 to 3-5 are all inactive (e.g. at S30), both the relay node 7 and the donor base station 5 of this embodiment determine that there are no active connections (respectively at S34 and S35) substantially simultaneously. The relay node 7 and the donor base station 5 then start respective timers (T1' and T1 respectively). On expiry of these timers the relay node 7 enters the RN-Un ESM (at S36) and the donor base station 5 initiates the base station side procedures for the RN-Un ESM (at S38) substantially simultaneously, after which S1/OAM signalling is transmitted to the relay node 7 using only the pre-configured sub-frames 15 for that relay node 7. The timers may be identical or may have different values to ensure effective synchronisation. Once the RN-Un ESM is activated the relay node 7 remains in a low energy consumption ('sleep') state for the sub-frames 15 that have not been preconfigured for S1/OAM signalling but 'wakes up' to monitor the sub-frames that have been preconfigured for S1/OAM signalling (at S39).

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above description, the donor base station 5 and the relay node 7 are described, for ease of understanding, as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the embodiments described above, the relay station and the donor base station will each include transceiver circuit. Typically, this circuit will be fainted by dedicated hardware circuits. However, in some embodiments, part of the transceiver circuit may be implemented as software run by the corresponding controller.

In the above embodiments, a number of software modules were described. As those skilled in the art will appreciate, the software modules may be provided in compiled or un-compiled form and may be supplied to the donor base station or the relay station as a signal over a computer network, or on a recording medium. Further, the functionality performed by part or all of this software may be performed using one or more dedicated hardware circuits.

It will be appreciated that any suitable signalling may be used in the configuration, activation and/or termination of the RN-Un ESM. For example, RRC messages other than the RRC Connection Reconfiguration RRC Connection Reconfiguration Complete messages may be used for configuring the sub-frames for use in the RN-Un ESM including modified versions of existing messages or new, dedicated, messages. For example, one or more new RRC messages (compared to rel-8/9 RRC messages) could also be defined. Indeed signalling other than RRC signalling could potentially be used given the versatility of the air interface between the relay node and the donor base station. An RRC Connection Reconfiguration message that informs the relay node 7 (e.g. a so called so called 'Type 1' relay node) of the multicast broadcast single frequency network (MBSFN)/backhaul sub-frame configuration could be used to inform the relay node of the sub-frame configuration for the RN-Un ESM configuration. Moreover, the relay node 7 may trigger exit from the energy saving mode by sending a scheduling request to the donor base station 5.

In another embodiment the configuration and activation could potentially be achieved in a single step 'on the fly' when the relay node 7 and/or donor base station 5 determines that the energy saving mode should be initiated, for example by using Medium Access Control (MAC) control elements (MAC-CE). In yet another embodiment a dedicated downlink control information (DCI) format is used for the specification of the pre-configured sub-frames 15. Moreover configuration of the pre-configured sub-frame(s) may be achieved using RRC signalling (e.g. as described previously) with activation of the energy saving mode being triggered and activation via MAC-CE.

Moreover, it will be appreciated that whilst, in the above embodiments, the sub-frame configuration is setup during the initial phase it could be setup at any suitable time. For example, the configuration can be changed as required using appropriate signalling, for example to ensure that the sub-frame configuration remains flexible to changes in the relay cell, such as the addition/removal of relay mobile telephones.

The signal used to request that the donor base station 5 initiate the base station side procedures for the RN-Un ESM may comprise a time stamp to allow the donor base station 5 and the relay node 7 to synchronise initiation of the RN-Un ESM to occur, for example, at a predetermined time relative to the time indicated by the time stamp. The time stamp may indicate the time at which the message is sent, or may indicate a time when the relay node 7 will enter the RN-Un ESM. Accordingly, the donor base station 5 may initiate the base station side procedures either at a predetermined time after that indicated by the time stamp or at the time indicated by the time stamp.

It will be appreciated that the donor base station may trigger exit from the RN-Un ESM, if required, by transmitting an explicit indication (e.g. a message requesting ESM termination). Such an indication may advantageously be sent in the sub-frames pre-configured for use for S1/OAM signalling by the relay node for which the message is intended. The relay node may exit the energy saving mode at any time in response to receiving uplink traffic from the mobile telephone 3.

It will be appreciated that there remains a possibility for the relay node 7 to use the existing rel-8/9 DRX mechanism separately, under different criteria, for example when there are a few active user devices being served by the relay node 7.

It will also be appreciated that, since the DRX mechanism considers retransmission to be different to new transmissions, the rel-8/9 mechanism for retransmission can be used. Alternatively, HARQ retransmissions could be scheduled on the DL over the same sub-frame number, in each radio frame, that the original transmission took place.

In an alternative embodiment energy saving can be achieved within a single frame by using an dedicated version of discontinuous reception DRX adapted for the relay node 7. Currently UEs are able to use a short DRX procedure in which the time period controlled by the DRX inactivity timer can be limited to a single sub-frame. However, for UEs the short DRX period is automatically followed by a conventional 'long' DRX (over many frames), which the inventors have found to be undesirable for the reasons discussed in the introduction. In this alternative embodiment, the relay node 7 employs short DRX but is prevented from going into a long DRX cycle. Accordingly, the relay node is able to monitor a predetermined number of frames within a single frame with some energy saving. It will be appreciated, however, that the maximum energy that can be saved using this short DRX mechanism is about half the maximum energy that can be saved by using the RN-Un ESM described in the above embodiments. This is because after the relay node 7 monitors the single sub-frame it is scheduled to it must wait until expiry of inactivity timer before it can enter a low energy consumption mode. Thus, unlike the RN-Un ESM described for earlier embodiments, a minimum of 2 sub-frames (as opposed to 1 sub-frame) will be monitored.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction

Intra eNB energy saving has been discussed under the study item network energy saving for E-UTRAN. In this contribution we analyse energy saving mechanisms for relay node.

2. Discussion 2.1 Energy Saving Over RN-Uu interface

Normally Relay node would be serving UEs connected to it but there is a possibility that when no active UE is connected to the RN e.g. during night time. Then, RN would be wasting its energy by keeping itself active over Un and Uu interface.

We think energy saving for a relay node is equally important as for an eNB over the RN-Uu interface and is quite obvious that same mechanisms under discussion for normal eNB as part of feasibility study would also apply to the RN-Uu interface.

Proposal 1: Energy Saving Mechanisms Currently Under Discussion for eNB Also Apply to RN-Uu.

2.2 Energy Saving Over RN-Un Interface

Compared to normal eNB, RN has wireless RN-Un interface and there is a possibility of power saving by not remaining active throughout the operation period [1]. So an RN can either move into Idle mode or to DRX over the Un interface, as already specified in rel-8/9. However if RN moves to Idle mode then it will remove S1/X2 and OAM context so we don't think RN must move to Idle mode.

Proposal 2: RN Must not be Moved to Idle Mode Due to Inactivity.

Further, the obvious mechanism for energy saving in RN-Un is to reuse DRX mechanism agreed for UEs in rel-8/9. But RN must support Paging for idle mode UEs under RN and there are some other bearers established for OAM purposes which are present even if there is no active UE under RN-Uu. These needs to be considered before any mechanism is selected for energy saving.

Below we explain existing paging mechanism:

2.2.1 Paging and DRX

S1-AP: Paging message can be received any time over the Un interface and one message is received per paged UE. There are max 4 Paging occasions (PO) allowed per paging frame (PF) in an eNB. UE calculates paging frame by using formula:

$$SFN \bmod T = (T \operatorname{div} N)*(UE\_ID \bmod N)$$

where:

T is DRX period

N=min[T, nB], if nB<T then N=nB otherwise N=T nB=4T, 2T, T, T/2, T/4, T/8, T/16, T/32 and broadcast in SIB2.

UE_ID=IMSI mod 1024

There are following points need to be considered:

Random nature of UE-ID (12 digits long IMSI mod 1024)

Number of Idle mode UEs present in a eNB. eNB has no information about idle mode UEs.

Size of TA and number of TAs supported by eNB. This depends on deployment.

DRX period of each UE and value of N

It can be concluded that effectively eNB must be prepared to send RRC Paging in every radio frame. Same requirement applies to Relay Node over RN-Uu. If RN is operating in DRX over Un interface during the time when paging message is being sent by MME to the DeNB then DeNB must wait till the time RN would start monitoring PDCCH and come out of DRX.

Even though RRC paging message delivery depends on UE DRX cycle and UE may miss paging message by a narrow margin and may have to wait till next wakeup time. Any excessive delay in delivering Paging message is not be acceptable as it result in longer overall call setup time (calling party delay). Allowing DRX over Un may result in doubling the Paging delay for a UE compared to when it is paged from normal eNB or RN. Such a distinction must be avoided.

Observation 1: RN Must be Prepared to Send RRC Paging on Every Radio Frame Over Uu.

This leaves to another observation that RN can sleep within one frame only and up to a maximum of 9 subframes (assuming only one subframe is used to receive S1-AP messages).

2.2.2 Issues with Existing DRX Mechanism

Problems with DRX when all UEs are idle:

Inactivity timer is synonymous with DRX switched off. This results in RN never going to sleep in rest of the subframes and energy saving can not be applied.

Short DRX to long DRX transition. This would result in delay in Paging message and a max up to 2.56 secs additional delay due to presence of RN and energy saving mechanism. Please note this delay does not occur in normal eNB.

If there are data users then DRX mechanism can be reused.

2.2.3 Proposed Mechanism:

It is proposed to use a mechanism whereby RN node must monitor certain preconfigured DL subframes in each radio frame. DeNB must schedule S1/OAM signaling over these preconfigured subframes only. The configuration can be done using RRC signaling and DeNB will inform RN number of subframes where it is possibly scheduled for S1/OAM traffic on downlink.

DeNB is aware of no users under RN being active because it maintains UE context (for proxy function). Alternatively, RN can explicitly inform DeNB to put it into energy saving mode when no RRC connection for any UE exists. Detailed proposal is described below:

Type 1 Relay Node

Assuming a scenario where Type 1 relay nodes are controlled by a DeNB and all UEs under the RNs are in idle mode. In the FIG. 6 RN1 is part of TA1 and RN2 is part of TA1,2,5. Since RN2 may receive more S1 Paging messages over Un compared to RN#1, a flexibility in terms of configuring resources per frame is required.

This is just one example scenario and a flexibility in configuring number of subframes can ensure if tighter delay requirements need to be met for paging.

The other scenario where configurable number of subframes are required is if eNB does not want to schedule S1 and OAM traffic into one single subframe.

Type 1a and Type 1b
Same as Type 1.
Interaction with DRX:
There is a possibility to use rel-8/9 DRX mechanism separately when e.g. there are few active users under the RN. Energy saving mode (ESM) is disabled as soon as there is uplink data to transmit.
Retransmissions:
Since DRX mechanism considers retransmission different to new transmission, rel-8/9 mechanism for retransmission can be used.
Alternatively, HARQ retransmissions should be scheduled on DL over same subframe # per radio frame where new transmission took place
Entering and Leaving Energy Saving Mode (ESM):
ESM entering can be further classified into two stages:
Configuration of ESM
Activation of ESM
During configuration phase, DeNB will inform subframe configuration which can be used when it will go to ESM. Activation phase involves when enter ESM criteria has been met and RN will start monitoring configured subframes only.
Configuration of ESM:
Configuration can be changed if required but normally done once during the initial phase. DeNB informs RN with RRC signaling and it could be e.g.:
First RRC Connection Reconfiguration message received by RN
For Type 1, same RRC Connection Reconfiguration message informing MBSFN/backhaul subframe configuration.
Activation of ESM:
Explicit Signaling:
DeNB< >RN signaling to communicate no active user exists under RN. RN will know if no UE context exists. DeNb will also maintain UE context for UEs under the RN (for the purpose of S1-AP Id mapping).
This method may be acceptable to companies who plan to have Proxy function in a separate hardware i.e. rel-8/9 eNB with upgraded RRC and MAC+additional hardware to perform Proxy function. So exact timing of UE context clearing in DeNB and RN will not be known.
Implicit (Timer Based):
As soon as DeNB and RN detect there are no active UEs, a timer is started with fixed value (timer value either is exchanged or hardcoded in 36.331). Some implementations may have an issue as stated above and in general, timing synchronization would be an issue. This proposal is mentioned for completion purpose here.
Alternatively, both configuration and activation can be achieved in single step e.g. by using MAC-CE.
Alternatively, a specific DCI format can be devised for this purpose.
When Should RN Exit Energy Saving Over Un:
Most likely message received over S1 will be S1:Paging and not every Paging over Uu will necessarily generate uplink traffic. This depends on size of paging area and probability of presence of paged UE under the RN.
So it is proposed that RN should exit energy saving configuration when it has uplink transmission from UEs connected to it.
This application is based upon and claims the benefit of priority from United Kingdom patent application No. 1017022.3, filed on Oct. 8, 2010, the disclosure of which is incorporated herein in its entirety by reference.

The invention claimed is:

1. A communications node for a communication system, the communications node comprising:
a transceiver circuit configured to communicate with an other communications node using a sequence of frames, each frame of the sequence of frames comprising a plurality of sub-frames, each sub-frame of the plurality of sub-frames comprising a plurality of slots, each slot of the plurality of slots comprising a plurality of orthogonal frequency division multiplex (OFDM) symbols;
a transceiver circuit configured to communicate with a plurality of mobile devices;
a controller configured to obtain information identifying a pre-determined sub-frame of each frame; and
an energy management controller configured to initiate an energy saving mode having a first period in which the pre-determined sub-frame of a frame is monitored for communications from the other communications node, and having a second period in which an other sub-frame of the frame is not monitored for communications from said other communications node,
wherein the energy saving mode is configurable such that in the first period a single sub-frame of a particular frame is monitored for communications from the other communications node, and in the second period the remaining sub-frames of the particular frame are not monitored for communications from the other communications node, and
wherein said energy management controller is configured to determine that said energy saving mode should be initiated based on communications activity of said mobile devices.

2. The communications node as claimed in claim 1, wherein said energy management controller is configured to determine that said energy saving mode should be initiated if a predetermined proportion of said plurality of mobile devices are operating in an idle status.

3. The communications node as claimed in claim 2, wherein said energy management controller is configured to determine that said energy saving mode should be initiated if all said plurality of mobile devices are operating in the idle status.

4. A communications node for a communication system, the communications node comprising:
a transceiver circuit configured to communicate with a plurality of mobile devices over a first interface;
a transceiver circuit configured to communicate with an other communications node over a second interface;
an energy management controller configured to operate in an energy saving mode having a first period in which said communications node monitors for communication from said other communications node in a pre-determined sub-frame, and having a second period in which the communications node does not monitor for communication from said other communications node in an other sub-frame;
an energy saving mode transceiver configured to obtain an indication of the pre-determined sub-frame; and
a mobile device status monitor configured to determine when the energy saving mode should be initiated and to initiate said energy saving mode based on activity of said mobile devices over said first interface.

5. A communications node for a communication system, the communications node comprising:
a transceiver circuit configured to communicate with an other communications node using a sequence of frames, each frame of the sequence of frames comprising a plurality of sub-frames, each sub-frame of the plurality of sub-frames comprising a plurality of slots, each slot of the plurality of slots comprising a plurality of orthogonal frequency division multiplex (OFDM) symbols; and an energy management controller configured to determine when said other communications node is in an energy saving mode, wherein said transceiver circuit is configured, when said other communications node is determined to be in said energy saving mode, to transmit signals to the other communications node in a single pre-determined sub-frame of a particular frame, and not transmit signals to the other communications node in the remaining sub-frames of the particular frame, wherein the communications node is configured to transmit information identifying the pre-determined sub-frame to said other communication node, wherein the communications node is configured to transmit said information identifying the pre-determined sub-frame to said other communication node when said other communication mode is about to initiate the energy saving mode, and wherein the communications node is configured to receive an indication from said other communications node that at least one criterion for entering said energy saving mode has been met, and to determine that said other communications node is about to initiate said energy saving mode based on receipt of said indication.

6. A communications node for a communication system, the communications node comprising:

a first transceiver circuit configured to communicate with an other communications node using a sequence of frames, each frame of the sequence of frames comprising a plurality of sub-frames, each sub-frame of the plurality of sub-frames comprising a plurality of slots, each slot of the plurality of slots comprising a plurality of orthogonal frequency division multiplex (OFDM) symbols;

a second transceiver circuit configured to communicate with a plurality of mobile devices via said other communications node; and an energy management controller configured to determine when said other communications node is in an energy saving mode, wherein said first transceiver circuit is configured, when said other communications node is determined to be in said energy saving mode, to transmit signals to the other communications node in a single pre-determined sub-frame of a particular frame, and not transmit signals to the other communications node in the remaining sub-frames of the particular frame, and wherein said determination of when said other communications node is in said energy saving mode is based on communications activity of said mobile devices via said other communications node.

7. The communications node as claimed in claim 6, wherein said determination of when said other communications node is in said energy saving mode is based on an assessment that a predetermined proportion of said plurality of mobile devices are operating in an idle status.

8. The communications node as claimed in claim 7, wherein said determination of when said other communications node is in said energy saving mode is based on an assessment that all said plurality of mobile devices are operating in the idle status.

9. The communications node as claimed in claim 6, wherein said determination of when said other communications node is in said energy saving mode is based on a time elapsed from said communications activity fulfilling a predetermined criterion.

10. The communications node as claimed in claim 6, wherein the communications node is configured to determine that said other communications node has terminated its energy saving mode, and wherein, on determining that said other communications node has terminated its energy saving mode, said communications node is configured to cease transmitting signals to the other communications node in the pre-determined sub-frame of the frame.

11. The communications node as claimed in claim 10, wherein the communications node is operable to determine that said other communications node has terminated its energy saving mode on receipt of a signal from at least one of said mobile devices via said other communications node.

12. The communications node as claimed in claim 10, wherein the communications node is operable to determine that said other communications node has terminated its energy saving mode on receipt of a signal from said other communications node.

* * * * *